(12) United States Patent
Mannas et al.

(10) Patent No.: US 11,306,578 B2
(45) Date of Patent: Apr. 19, 2022

(54) THERMAL BARRIER FOR DOWNHOLE FLASKED ELECTRONICS

(71) Applicant: Baker Hughes, a GE company, LLC, Houston, TX (US)

(72) Inventors: Michael Joseph Mannas, Edmond, OK (US); Dominik Hoheisel, Hemmingen (DE); Thomas Kruspe, Niedersachsen (DE); Sebastian Jung, Isernhagen (DE)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 580 days.

(21) Appl. No.: 15/954,224

(22) Filed: Apr. 16, 2018

(65) Prior Publication Data

US 2019/0316460 A1  Oct. 17, 2019

(51) Int. Cl.
| | | |
|---|---|---|
| *E21B 47/01* | (2012.01) | |
| *E21B 47/017* | (2012.01) | |
| *F28F 7/02* | (2006.01) | |
| *E21B 36/00* | (2006.01) | |

(52) U.S. Cl.
CPC ............ *E21B 47/017* (2020.05); *E21B 36/00* (2013.01); *F28F 7/02* (2013.01); *F28F 2270/00* (2013.01)

(58) Field of Classification Search
CPC ...... E21B 36/00; E21B 36/001; E21B 47/013; E21B 47/017; E21B 47/0175; F28F 2270/00; F28F 7/02; F25F 7/02
See application file for complete search history.

(56) References Cited

U.S. PATENT DOCUMENTS

| | | | |
|---|---|---|---|
| 4,034,468 A | | 7/1977 | Koopman |
| 4,241,592 A | | 12/1980 | Tapphorn |
| 4,375,157 A | | 3/1983 | Boesen |
| 4,407,136 A | * | 10/1983 | de Kanter ............. E21B 36/001 |
| | | | 165/104.21 |

(Continued)

FOREIGN PATENT DOCUMENTS

| | | |
|---|---|---|
| EP | 0148694 A1 | 7/1985 |
| WO | 2006055099 A2 | 5/2006 |

OTHER PUBLICATIONS

Dewar Heat Shields—Protecting sensor electronics is an area of growing concern to oil and gas operators wishing to deploy high temperature logging systems, acoustic leak detectors and camera systems in HPHT downhole anvironments, Severn Subsea Technologies, http://www.severnst.com/services/technologies/heat-resistance/heat-resistance-dewar-technology.

(Continued)

*Primary Examiner* — Christopher J Sebesta
(74) *Attorney, Agent, or Firm* — Cantor Colburn LLP (57) ABSTRACT

Apparatus and methods directed to an assembly associated with a downhole tool, and including: a thermal housing; at least one internal component inside the thermal housing, wherein the at least one internal component comprises at least one thermally sensitive component; and a thermal isolation support connecting the at least one internal component to the tool. The thermal isolation support may comprise an additive manufacturing structural framework connected to the tool. The structural framework may include a plurality of structural members, with a majority of the plurality of structural members substantially non-parallel with a longitudinal axis of the downhole tool.

20 Claims, 8 Drawing Sheets

(56) References Cited

U.S. PATENT DOCUMENTS

| | | | |
|---|---|---|---|
| 4,440,219 A | | 4/1984 | Engelder |
| 5,931,000 A | | 8/1999 | Turner et al. |
| 6,336,408 B1 | | 1/2002 | Parrott et al. |
| 6,769,487 B2 | * | 8/2004 | Hache ............... F25B 39/02 166/302 |
| 6,877,332 B2 | | 4/2005 | DiFoggio |
| 7,308,795 B2 | | 12/2007 | Hall et al. |
| 7,440,283 B1 | * | 10/2008 | Rafie ............... E21B 47/017 361/709 |
| 7,921,913 B2 | | 4/2011 | Tchakarov et al. |
| 9,097,088 B2 | | 8/2015 | Takeda et al. |
| 2005/0005624 A1 | * | 1/2005 | DiFoggio ............ E21B 49/08 62/259.2 |
| 2005/0151555 A1 | | 7/2005 | Lewis et al. |
| 2006/0102353 A1 | | 5/2006 | Storm et al. |
| 2006/0108116 A1 | | 5/2006 | Morys et al. |
| 2009/0004454 A1 | | 1/2009 | Aumaugher et al. |
| 2012/0070306 A1 | | 3/2012 | Lee et al. |
| 2014/0076531 A1 | * | 3/2014 | Hallundbæk ......... E21B 47/017 166/65.1 |
| 2015/0000913 A1 | | 1/2015 | Lelong-Feneyrou et al. |
| 2016/0145996 A1 | | 5/2016 | Goodman et al. |

OTHER PUBLICATIONS

PCT Application No. PCT/US2019/027732—International Search Report dated Aug. 13, 2019.

PCT Application No. PCT/US2019/027714—International Search Report dated Jul. 29, 2019.

Dewar Heat Shields—Protecting sensor electronics is an area of growing concern to oil and gas. http://www.severnst.com/services/technologies/heat-resistance/heat-resistance-dewar-technology.

Leak detectors and camera systems in HPHT downhole environments, Severn Subsea Technologies.

Operators wishing to deploy high temperature logging systems, acoustic.

* cited by examiner

Water    Steam

THERMAL BARRIER FOR DOWNHOLE FLASKED ELECTRONICS

FIELD OF THE DISCLOSURE

In one aspect, this disclosure relates generally to methods, devices, and systems for thermally isolating heat sensitive components used in downhole applications in a borehole in an earth formation.

BACKGROUND OF THE DISCLOSURE

Underground wells may be drilled for geothermal purposes, to produce hydrocarbons (e.g., oil and gas), to produce water, and so on. Well depth may range from a few thousand feet to 25,000 feet or more. Downhole tools, used during and after drilling, often incorporate various sensors, instruments and control devices in order to carry out any number of downhole operations. Thus, the tools may include sensors and/or electronics for formation evaluation, fluid analysis, monitoring and controlling the tool itself, and so on.

Borehole temperatures can vary from ambient up to about 500° F. (260° C.) and pressures from atmospheric up to about 30,000 psi (206.8 mega pascals). Temperature and pressure conditions such as these can have an adverse effect on instruments used downhole. Heat especially can be undesirable for tools having electronic components. Elevated temperatures in the borehole may cause thermally sensitive electronic components to work more slowly or even fail.

One traditional method for dealing with heat downhole is to avoid it. For example, it is known in the art that a system that includes a plurality of temperature sensors distributed in an oil well in the wellbore where at least some of the sensors are in a heat affected zone can be monitored using a downhole processor positioned proximate and substantially outside of the heat affected zone to receive and digitize temperature measurements. Elevated temperature (or "hot") conditions, as referred to herein, may be defined as an ambient temperature which compromises or impairs the structural integrity, operating efficiency, operating life, or reliability of a given tool, device, or instrument.

Other methods of dealing with heat downhole are also known. For example, an alternative approach to keeping tools having electronics out of the hot zones is to subject the tools to a circulation of a coolant through a thermal conduit thermally coupled to a chassis heat exchange element including a plurality of receiving sections thermally coupled to a corresponding plurality of electronic devices. A tool having such a chassis heat exchange element may operate in a hot downhole environment, including logging and drilling operations.

SUMMARY OF THE DISCLOSURE

Aspects of the present disclosure include apparatus, systems, components, products, and methods for use in investigating an earth formation from a borehole in the formation. Apparatus embodiments may include an assembly associated with a downhole tool and configured to thermally isolate a thermally sensitive component. The assembly may comprise a thermal housing; at least one internal component inside the thermal housing, wherein the at least one internal component comprises at least one thermally sensitive component; and a thermal isolation support connecting the at least one internal component to the tool. The thermal isolation support may comprise an additive manufacturing structural framework connected to the tool. The thermal isolation support may comprise a mesh sleeve. The at least one internal component may comprise a chassis. The thermally sensitive component may be mounted on the chassis and the thermal isolation support may connect the chassis to the tool. The at least one thermally sensitive component may include at least one downhole electronic component.

The additive manufacturing structural framework may include a plurality of structural members. The majority of the plurality of structural members may be substantially non-parallel with a longitudinal axis of the downhole tool. At least one structural member of the framework may be connected to at least one other structural member. The structural members may be tubular. The framework may comprise a mesh. The at least one internal component may be supported substantially exclusively by the thermal isolation support. The additive manufacturing structural framework may take up less than 65 percent of the space defined by a hollow cylinder most closely fitting the framework.

The additive manufacturing structural framework may be a multi-material additive manufacturing structure and may include first members oriented in a first direction and second members oriented in a second direction different than the first direction. The first members may include a first material and the second members may include a second material different than the first material. The multi-material additive manufacturing structure may include first members comprising a first material and second members comprising a second material different than the first material. The multi-material additive manufacturing structure may comprise clockwise helixes of a first material and counterclockwise helixes of another material.

The additive manufacturing structural framework may be implemented as a multi-material additive manufacturing structure which may comprise electrical conductors. The multi-material additive manufacturing structure may comprise an electrically insulating non-metallic material joined with at least one of: i) titanium; and ii) inconel. The electrically insulating non-metallic material may comprise at least one of i) a plastic; and ii) a polymer. The framework may define at least one of: i) first channels of an active cooling system configured to transfer fluid into an interior of the thermal housing; and ii) second channels of the active cooling system configured to transfer fluid from the interior of the thermal housing.

Method embodiments may include conveying a downhole tool in the borehole, the downhole tool having associated therewith an assembly configured to thermally isolate a thermally sensitive component. The assembly may be configured as described above. The assembly may include a thermal housing; at least one internal component inside the thermal housing, wherein the at least one internal component comprises at least one thermally sensitive component; and a thermal isolation support connecting the at least one internal component to the tool. The thermal isolation support may include an additive manufacturing structural framework connected to the tool.

Examples of some features of the disclosure may be summarized rather broadly herein in order that the detailed description thereof that follows may be better understood and in order that the contributions they represent to the art may be appreciated.

BRIEF DESCRIPTION OF THE DRAWINGS

For a detailed understanding of the present disclosure, reference should be made to the following detailed description of the embodiments, taken in conjunction with the accompanying drawings, in which like elements have been given like numerals, wherein.

DETAILED DESCRIPTION

Aspects of the present disclosure relate to thermally isolating a thermally sensitive component in a tool downhole from a high-temperature environment. The present disclosure relates to devices and methods for isolating heat sensitive components from a wellbore environment and/or heat generated by downhole components. In particular, aspects of the disclosure relate to flask-type thermal isolation systems. Aspects include apparatus for investigating a subterranean earth formation from a borehole in the formation or other use in a borehole intersecting an earth formation, such as apparatus related to drilling a borehole in an earth formation, performing well logging in a borehole intersecting an earth formation, and so on.

Aspects of the present disclosure provide a novel way of thermally isolating electronics inside downhole drilling or logging tools. Embodiments disclosed herein may include an assembly associated with a downhole tool and configured to thermally isolate a thermally sensitive component. The assembly may include a thermal housing; a chassis interior to the thermal housing; at least one thermally sensitive component mounted on the chassis; and a thermal isolation support connecting the chassis to the tool.

In some embodiments, the thermal isolation support comprises a framework of a plurality of structural members attached to a base member connected to the tool. The framework may be implemented as a lattice, or mesh. Each of at least a portion of the structural members may deviate at least 30 degrees from an axis parallel to a longitudinal axis of the downhole tool. By this increased deviation from vertical, thermal energy must travel a significantly longer distance along the support members to reach the end of the thermal isolation support coupled to the chassis upon which the thermally sensitive components are mounted, and thus the amount of time required for elevation of temperature at those components to a level sufficient to affect performance is increased. Thus, the thermal isolation support experiences a graduated elevation in temperature along its length as the tool is exposed to elevated temperatures, with the first end experiencing greater changes in temperature (and more quickly) than the second end.

At least one structural member of the framework may be connected to at least one other structural member for increased stability of the framework. For example, the framework may be implemented as a mesh of connected structural members. The structural members may be tubular so that an active cooling system or cabling may be implemented inside at least one structural member.

The framework may comprise a multi-material additive manufacturing structure. The multi-material additive manufacturing structure may comprise electrical conductors. The multi-material additive manufacturing structure may comprise an electrically insulating non-metallic material joined with at least one of: i) titanium; and ii) inconel. The electrically insulating non-metallic material may include at least one of i) a plastic; and ii) a polymer (e.g., polyether ether ketone ('PEEK')).

Thus, by utilizing multi-material additive manufacturing, portions of the structure may be configured for employment in performing the functions of system components such as power and communications cabling, active cooling system tubing, and the like, in addition to providing a thermally isolated mount for supporting the thermally sensitive components (e.g., electronics). Aspects of the present disclosure merge key functionality into the multi-material additive manufacturing structure, thus reducing the total number of heat paths between the environment exterior to the container and the container's interior (and thus, the thermally sensitive component).

The term "thermally sensitive component" (or "heat sensitive component") shall hereinafter be used to refer to any tool, electrical component, sensor, electronic instrument, structure, or material that degrades either in performance or in integrity when exposed to temperatures above 200 degrees centigrade. For purposes of discussion, a wellbore may be considered "hot" if the ambient temperature compromises or impairs the structural integrity, operating efficient, operating life, or reliability of a given tool, device, or instrument.

Techniques described herein are particularly suited for use in measurement of values of properties of a formation downhole or of a downhole fluid while drilling, through the use of instruments which may utilize components as described herein, or otherwise for use in conducting operations downhole. These values may be used to evaluate and model the formation, the borehole, and/or the fluid, and for conducting further operations in the formation or the borehole.

Figure 1A:
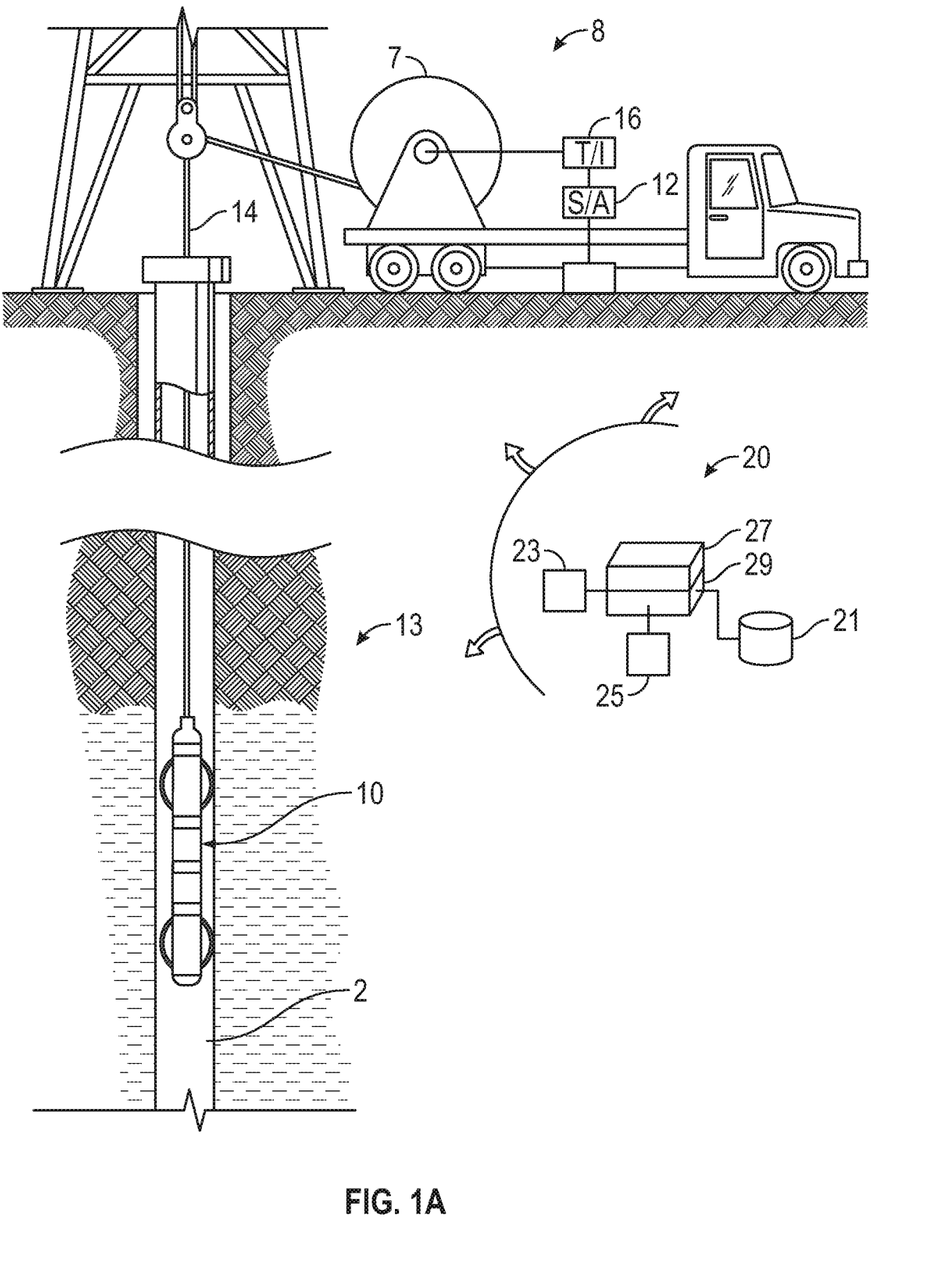
FIG. 1A is a schematic diagram of an example wireline well logging tool in accordance with embodiments of the present disclosure.

Referring to FIG. 1A, a wireline well logging tool 10 is shown being lowered into a wellbore 2 penetrating earth formations 13. The tool 10 may be lowered into the wellbore 2 and withdrawn therefrom by a carrier 14 (e.g., an armored electrical cable). In one embodiment, circuitry associated with the tool may be configured to take measurements using instruments associated with the tool as the tool moves along the longitudinal axis of the borehole ('axially'). The cable 14 can be spooled by a winch 7 or similar device known in the art. The cable 14 may be electrically connected to a surface recording system 8 of a type known in the art which can include a signal decoding and interpretation unit 16 and a recording unit 12. Signals transmitted by the logging tool 10 along the cable 14 can be decoded, interpreted, recorded and processed by the respective units in the surface system 8.

Systems in accordance with the present disclosure may alternatively include a conventional derrick and a conveyance device, which may be rigid or non-rigid, which may be configured to convey the downhole tool 10 in the wellbore. Drilling fluid ('mud') may be present in the borehole. The carrier may be a drill string, coiled tubing, a slickline, an e-line, a wireline, etc. Downhole tool 10 may be coupled or combined with additional tools, including, e.g., some or all the information processing system as implemented by hardware environment 20. Thus, depending on the configuration, the tool 10 may be used during drilling and/or after the wellbore has been formed. While a land system is shown, the teachings of the present disclosure may also be utilized in offshore or subsea applications. The carrier may include a bottom hole assembly, which may include a drilling motor for rotating a drill bit.

Certain embodiments of the present disclosure may be implemented with a hardware environment 20 that includes an information processor 27, an information storage medium 23, an input device 25, processor memory 29, and may include peripheral information storage medium 21. The hardware environment may be in the well, at the rig, or at a remote location. Moreover, the several components of the hardware environment may be distributed among those locations. The input device 25 may be any data reader or user input device, such as data card reader, keyboard, USB port, etc. The information storage medium 23 stores information provided by the detectors. Information storage medium 23 may include any non-transitory computer-readable medium for standard computer information storage, such as a USB drive, memory stick, hard disk, removable RAM, EPROMs, EAROMs, flash memories and optical disks or other commonly used memory storage system known to one of ordinary skill in the art including Internet based storage. Information storage medium 23 stores a program that when executed causes information processor 27 to execute the disclosed method. Information storage medium 23 may also store the formation information provided by the user, or the formation information may be stored in a peripheral information storage medium 21, which may be any standard computer information storage device, such as a USB drive, memory stick, hard disk, removable RAM, or other commonly used memory storage system known to one of ordinary skill in the art including Internet based storage. Information processor 27 may be any form of computer or mathematical processing hardware, including Internet based hardware. When the program is loaded from information storage medium 23 into processor memory 29 (e.g. computer RAM), the program, when executed, causes information processor 27 to retrieve detector information from either information storage medium 23 or peripheral information storage medium 21 and process the information to estimate a parameter of interest. Information processor 27 may be located on the surface or downhole.

Aspects of the present disclosure are subject to application in various different embodiments. In some general embodiments, the carrier is implemented as a tool string of a drilling system, and the acoustic wellbore logging may be characterized as "logging-while-drilling" (LWD) or "measurement-while-drilling" (MWD) operations.

Figure 1B:
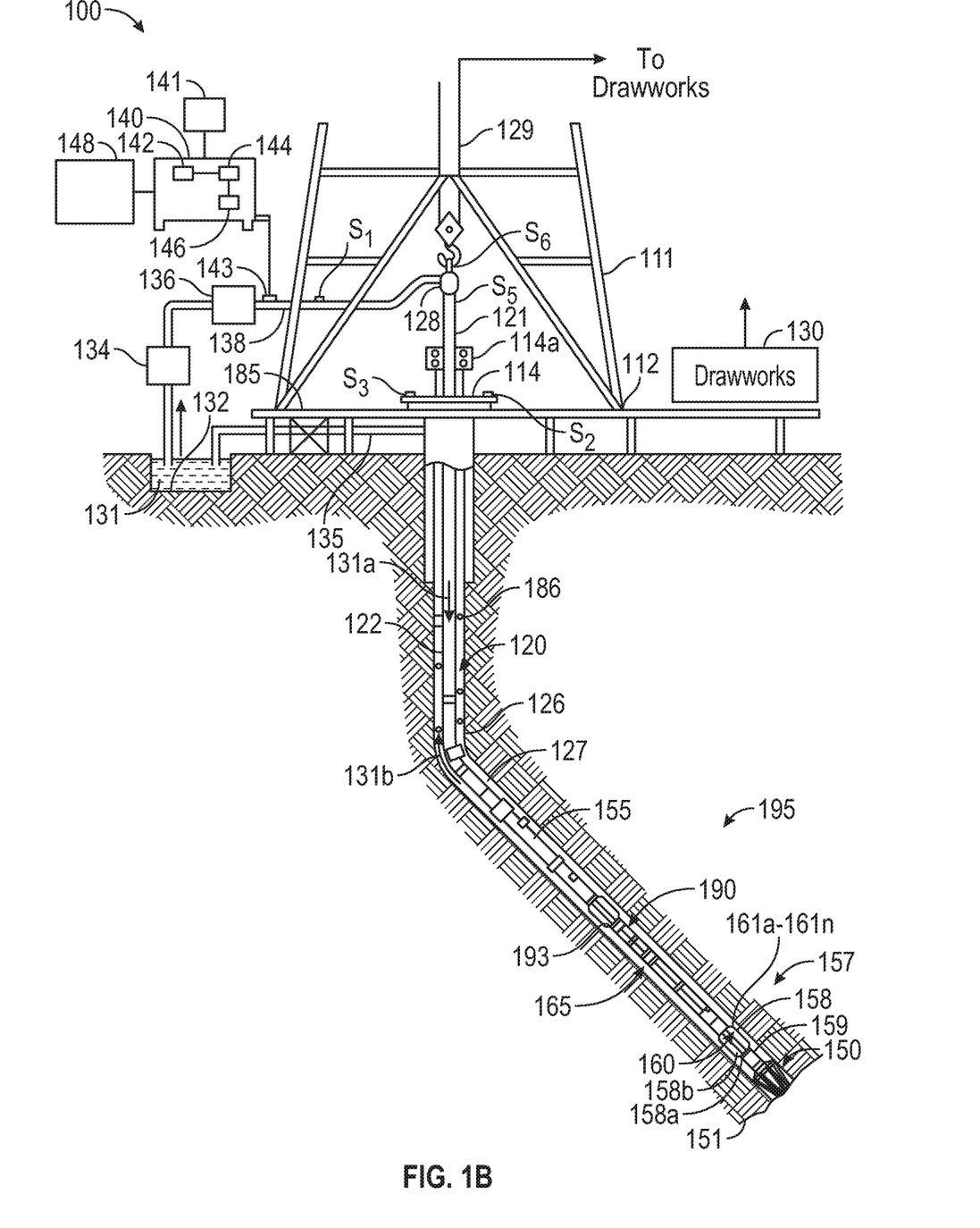
FIG. 1B is a schematic diagram of an example drilling system in accordance with embodiments of the present disclosure.

FIG. 1B is a schematic diagram of an example drilling system 101 in accordance with embodiments of the present disclosure. FIG. 1B shows a drillstring (drilling assembly) 120 that includes a bottomhole assembly (BHA) 190 conveyed in a borehole 126. The drilling system 100 includes a conventional derrick 111 erected on a platform or floor 112 which supports a rotary table 114 that is rotated by a prime mover, such as an electric motor (not shown), at a desired rotational speed. A tubing (such as jointed drill pipe 122), having the drillstring 190, attached at its bottom end extends from the surface to the bottom 151 of the borehole 126. A drillbit 150, attached to drillstring 190, disintegrates the geological formations when it is rotated to drill the borehole 126. The drillstring 120 is coupled to a drawworks 130 via a Kelly joint 121, swivel 128 and line 129 through a pulley. Drawworks 130 is operated to control the weight on bit ("WOB"). The drillstring 120 may be rotated by a top drive (not shown) instead of by the prime mover and the rotary table 114. Alternatively, a coiled-tubing may be used as the tubing 122. A tubing injector 114a may be used to convey the coiled-tubing having the drillstring attached to its bottom end. The operations of the drawworks 130 and the tubing injector 114a are known in the art and are thus not described in detail herein.

A suitable drilling fluid 131 (also referred to as the "mud") from a source 132 thereof, such as a mud pit, is circulated under pressure through the drillstring 120 by a mud pump 134. The drilling fluid 131 passes from the mud pump 134 into the drillstring 120 via a desurger 136 and the fluid line 138. The drilling fluid 131a from the drilling tubular discharges at the borehole bottom 151 through openings in the drillbit 150. The returning drilling fluid 131b circulates uphole through the annular space 127 between the drillstring 120 and the borehole 126 and returns to the mud pit 132 via a return line 135 and drill cutting screen 185 that removes the drill cuttings 186 from the returning drilling fluid 131b.

In some applications, the drillbit 150 is rotated by only rotating the drill pipe 122. However, in many other applications, a downhole motor 155 (mud motor) disposed in the drillstring 190 also rotates the drillbit 150. The rate of penetration (ROP) for a given BHA largely depends on the WOB or the thrust force on the drillbit 150 and its rotational speed.

The mud motor 155 is coupled to the drillbit 150 via a drive shaft disposed in a bearing assembly 157. The mud motor 155 rotates the drillbit 150 when the drilling fluid 131 passes through the mud motor 155 under pressure. The bearing assembly 157, in one aspect, supports the radial and axial forces of the drillbit 150, the down-thrust of the mud motor 155 and the reactive upward loading from the applied weight-on-bit.

A surface control unit or controller 140 receives signals from the downhole sensors and devices via a sensor 143 placed in the fluid line 138 and signals from sensors S1-S6 and other sensors used in the system 100 and processes such signals according to programmed instructions provided to the surface control unit 140. The surface control unit 140 displays desired drilling parameters and other information on a display/monitor 141 that is utilized by an operator to control the drilling operations. The surface control unit 140 may be a computer-based unit that may include a processor 142 (such as a microprocessor), a storage device 144, such as a solid-state memory, tape or hard disc, and one or more computer programs 146 in the storage device 144 that are accessible to the processor 142 for executing instructions contained in such programs. The surface control unit 140 may further communicate with a remote control unit 148. The surface control unit 140 may process data relating to the drilling operations, data from the sensors and devices on the surface, data received from downhole, and may control one or more operations of the downhole and surface devices. The data may be transmitted in analog or digital form.

The BHA 190 may also contain formation evaluation sensors or devices (also referred to as measurement-while-drilling ("MWD") or logging-while-drilling ("LWD") sensors) determining resistivity, density, porosity, permeability, acoustic properties, nuclear-magnetic resonance properties, formation pressures, properties or characteristics of the fluids downhole and other desired properties of the formation 195 surrounding the BHA 190. Such sensors are generally known in the art and for convenience are generally denoted herein by numeral 165. The BHA 190 may further include other sensors and devices 159 for determining one or more properties of the BHA 190 generally (such as vibration, acceleration, oscillations, whirl, stick-slip, etc.) and general drilling operating parameters (such as weight-on-bit, fluid flow rate, pressure, temperature, rate of penetration, azimuth, tool face, drillbit rotation, etc.) For convenience, all such sensors are denoted by numeral 159.

The BHA 190 may include a steering apparatus or tool 158 for steering the drillbit 150 along a desired drilling path. In one aspect, the steering apparatus may include a steering unit 160, having a number of force application members 161a-161n, wherein the steering unit is at partially integrated into the drilling motor. In another embodiment the steering apparatus may include a steering unit 158 having a bent sub and a first steering device 158a to orient the bent sub in the wellbore and the second steering device 158b to maintain the bent sub along a selected drilling direction.

Suitable systems for making dynamic downhole measurements include COPILOT, a downhole measurement system, manufactured by BAKER HUGHES INCORPORATED. Any or all of these sensors may be used in carrying out the methods of the present disclosure.

The drilling system 100 can include one or more downhole processors at a suitable location such as 193 on the BHA 190. The processor(s) can be a microprocessor that uses a computer program implemented on a suitable non-transitory computer-readable medium that enables the processor to perform the control and processing. Other equipment such as power and data buses, power supplies, and the like will be apparent to one skilled in the art. In one embodiment, the MWD system utilizes mud pulse telemetry to communicate data from a downhole location to the surface while drilling operations take place. Other embodiments could include wired pipe telemetry, wire telemetry in coiled tubing, electro-magnetic telemetry, acoustic telemetry, and so on. The surface processor 142 can process the surface measured data, along with the data transmitted from the downhole processor, to evaluate a condition of drillstring components. While a drillstring 120 is shown as a conveyance system for sensors 165, it should be understood that embodiments of the present disclosure may be used in connection with tools conveyed via rigid (e.g. jointed tubular or coiled tubing) as well as non-rigid (e. g. wireline, slickline, e-line, etc.) conveyance systems. The drilling system 100 may include a bottomhole assembly and/or sensors and equipment for implementation of embodiments of the present disclosure.

The term "information" as used herein includes any form of information (analog, digital, EM, printed, etc.). As used herein, a processor is any information processing device that transmits, receives, manipulates, converts, calculates, modulates, transposes, carries, stores, or otherwise utilizes information. In several non-limiting aspects of the disclosure, an information processing device includes a computer that executes programmed instructions for performing various methods. These instructions may provide for equipment operation, control, data collection and analysis and other functions in addition to the functions described in this disclosure. The processor may execute instructions stored in computer memory accessible to the processor, or may employ logic implemented as field-programmable gate arrays ('FPGAs'), application-specific integrated circuits ('ASICs'), other combinatorial or sequential logic hardware, and so on.

The surface control unit 140 may further communicate with a remote control unit 148. The surface control unit 140 may process data relating to the drilling operations, data from the sensors and devices on the surface, and data received from downhole; and may control one or more operations of the downhole and surface devices. The data may be transmitted in analog or digital form.

Surface processor 142 or downhole processor 193 may also be configured to control steering apparatus 158, mud pump 134, drawworks 130, rotary table 114, downhole motor 155, other components of the BHA 190, or other components of the drilling system 101. Surface processor 142 or downhole processor 193 may be configured to control sensors described above and to estimate a parameter of interest according to methods described herein.

The BHA as well as the logging tool may include thermally sensitive components. Such components include those that incorporate transistors, integrated circuits, resistors, capacitors, and inductors, as well as electronic components such as sensing elements, including accelerometers, magnetometers, photomultiplier tubes, and strain gages. The thermal isolation systems provided by the present disclosure, such as those shown in the Figures, may be utilized to protect these components from the hot wellbore environment. The BHA may also include communication devices, transmitters, repeaters, processors, power generation devices, or other devices that may incorporate heat sensitive components. In many applications, the drilling system may be operated for well over eight hours downhole.

Conventional systems for thermal isolation are known. One type of conventional system employs a container designed to protect heat sensitive components from high temperature environments, such as a Dewar-like vacuum flask. The sensitive components may be positioned within the container and conveyed into a wellbore. The container may be directly inserted into a wellbore tool string, or may be positioned in a housing (e.g., a sub, a module or other suitable structure). The container provides a thermal barrier that isolates heat sensitive components from ambient wellbore temperatures. The container may employ a conventional double wall construction with an interstitial vacuum typical of Dewar flasks, but may be of any suitable configuration that prevents or reduces heat transfer from the downhole environment to the electronics package.

More recently, an improved thermal isolation device, described in U.S. Pat. No. 7,440,283 to Rafie, commonly owned with the present application and incorporated herein by reference in its entirety, includes one or more heat sinks and a thermal isolator. The thermal isolator mechanically connects an assembly including the internal components to the container. The heat sinks are positioned in a chain between the isolator and electronic components. Traditionally, heat sinks provide thermal isolation by diverting heat flow away from heat sensitive components.

Thermal Isolation Support for Active Cooling Systems

General embodiments of the present disclosure may include a tool for performing well logging in a borehole intersecting an earth formation. Aspects of the present disclosure may be utilized to increase temperature survival time of downhole tools and thereby increase the time heat sensitive equipment may be deployed in a wellbore. As will be appreciated, the present invention is susceptible to embodiments of different forms. There are shown in the drawings, and herein will be described in detail, specific embodiments of the present invention with the understanding that the present disclosure is to be considered an exemplification of the principles of the invention, and is not intended to limit the invention to that illustrated and described herein. Further, while embodiments may be described as having one or more features or a combination of two or more features, such a feature or a combination of features should not be construed as essential unless expressly stated as essential.

Figure 2:
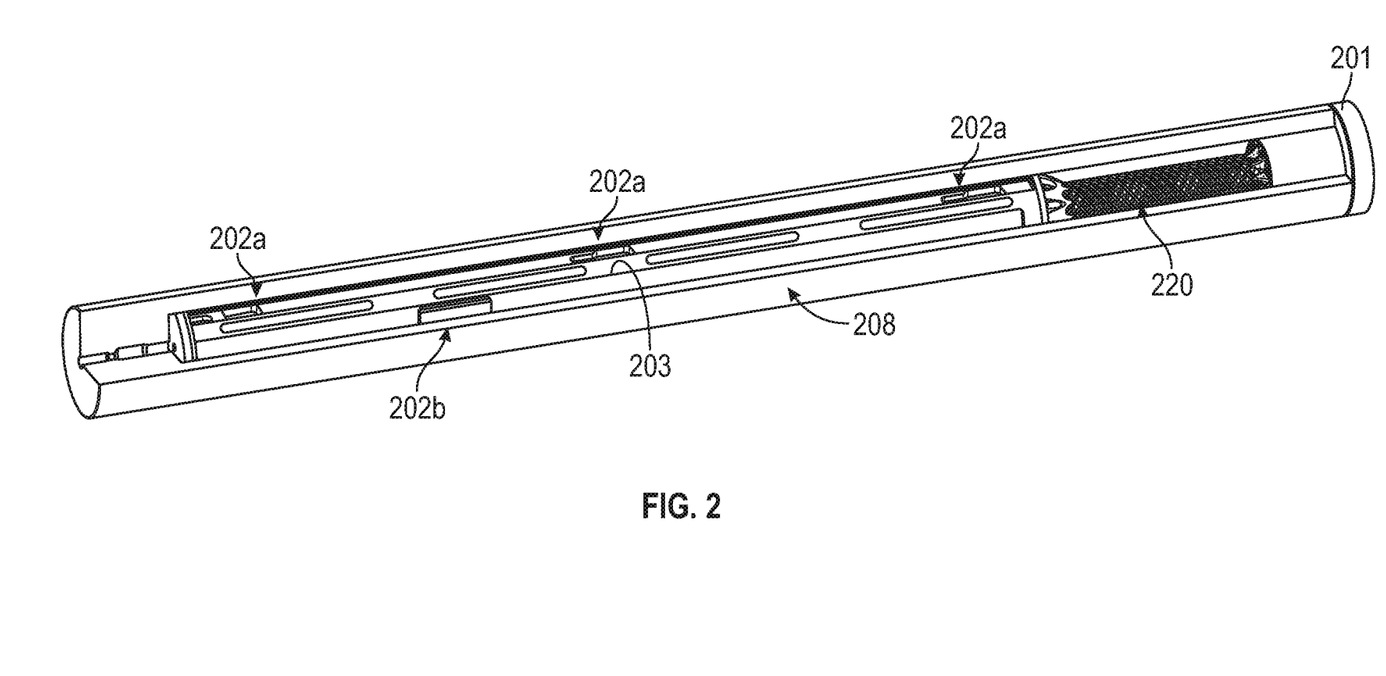
FIG. 2 shows a schematic tool diagram illustrating embodiments in accordance with embodiments of the present disclosure.
Figure 3A:
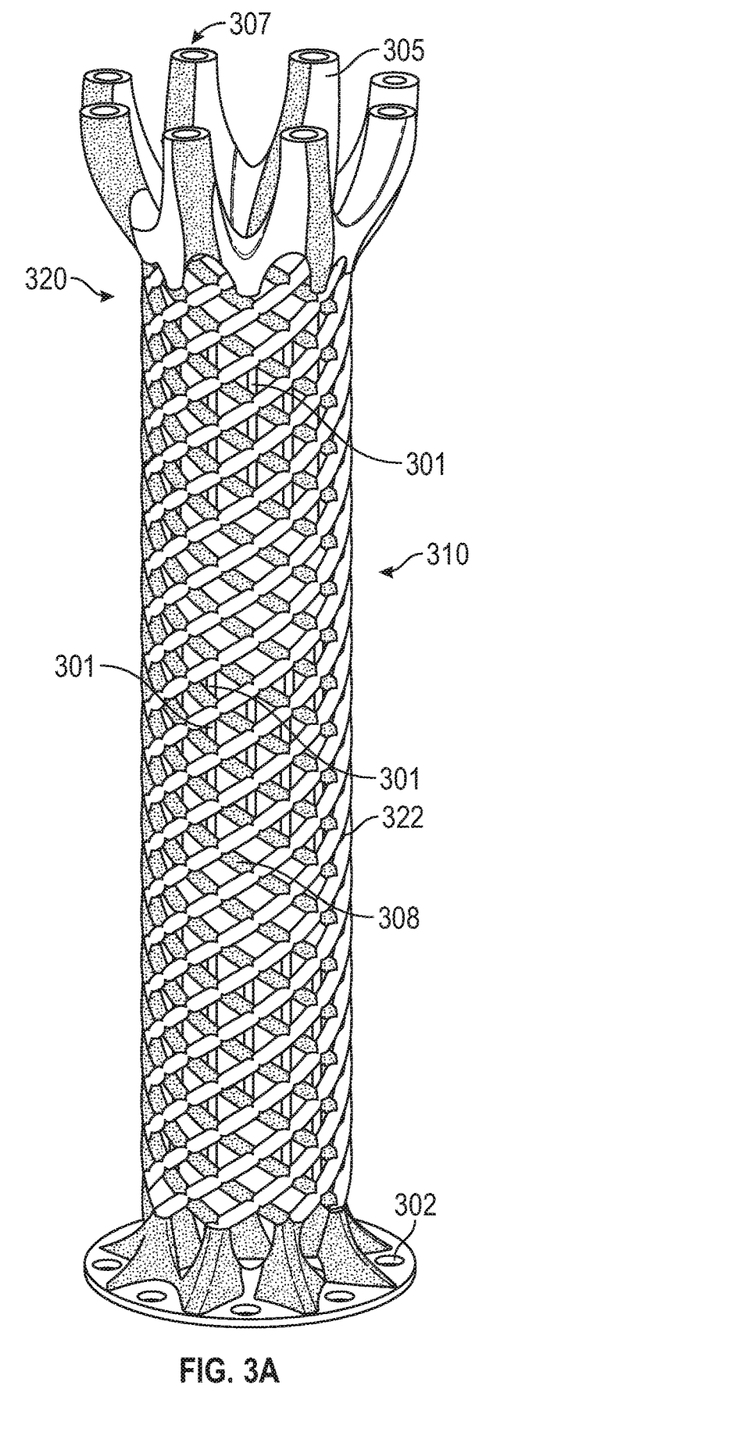
FIGS. 3A-3E illustrate a thermal isolation support in accordance with embodiments of the present disclosure.
Figure 3B:
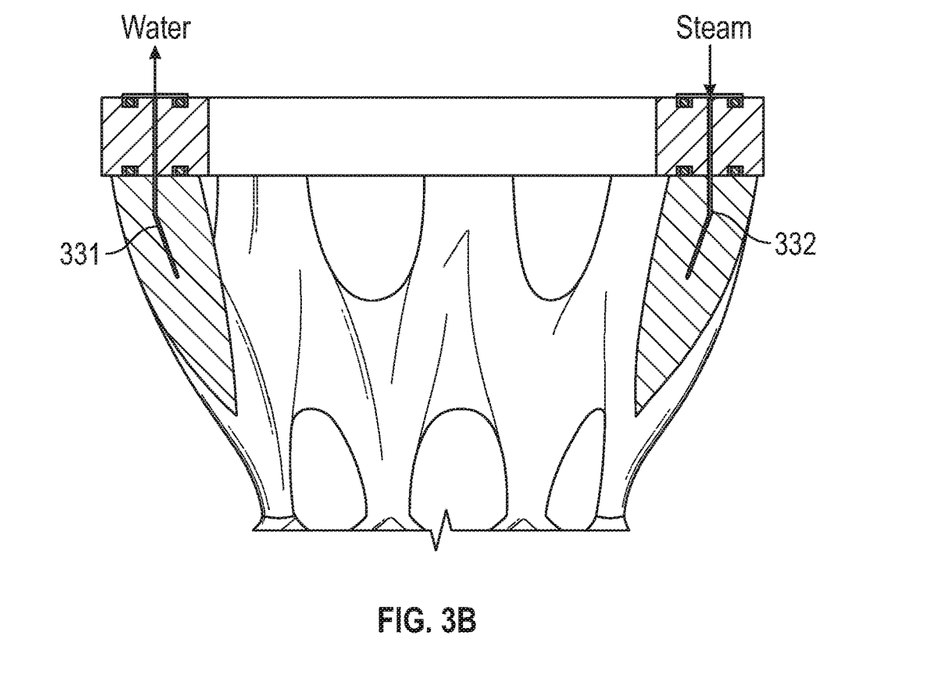
Figure 3C:
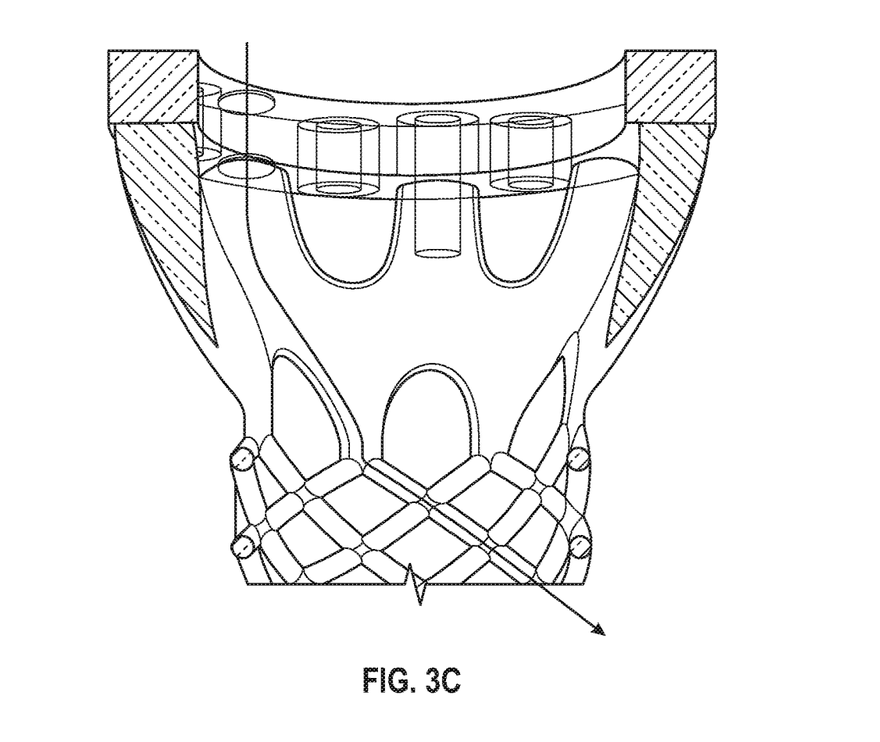
Figure 3D:
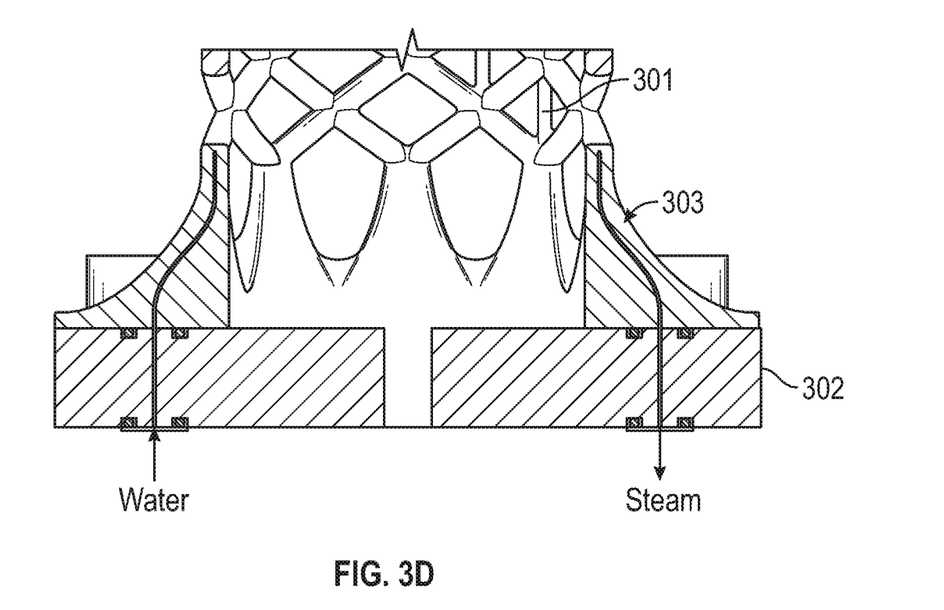
Figure 3E:
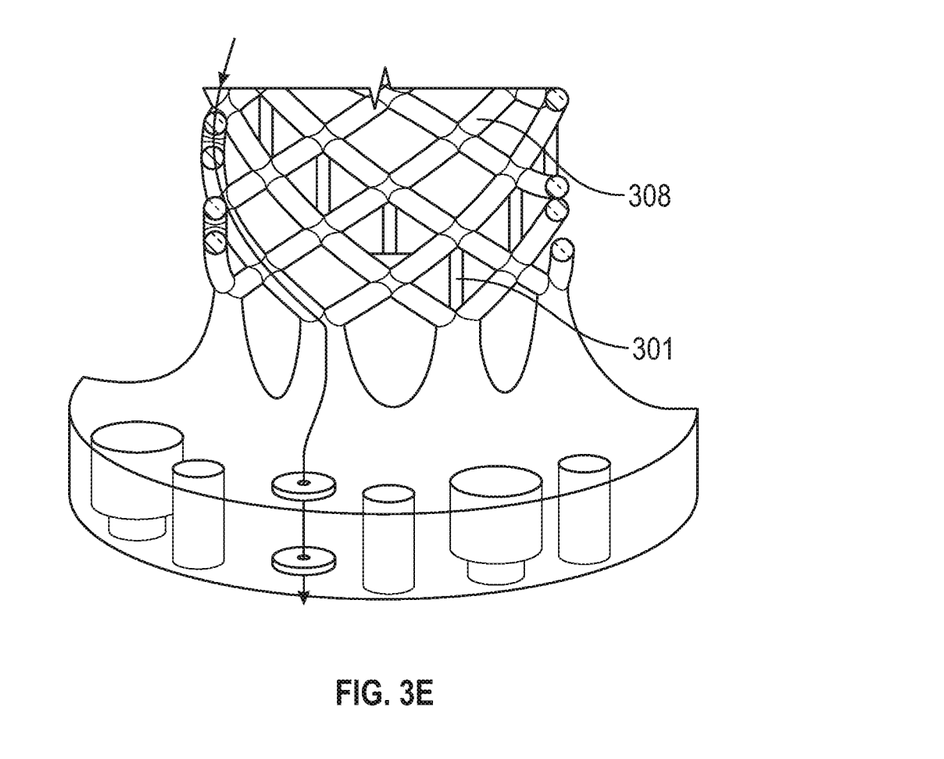

FIG. 2 shows a schematic tool diagram illustrating embodiments in accordance with embodiments of the present disclosure. FIG. 2 illustrates an exemplary assembly 200 for isolating one or more heat sensitive components 202a, 202b that may be mounted on and supported by a chassis 203. The components 202a, 202b may be positioned within a thermal housing 208 and conveyed into a wellbore. The thermal housing 208 provides a thermal barrier that isolates heat sensitive components from ambient wellbore temperatures.

The thermal housing 208 may comprise a container positioned within an outer member, such as a sub, a module or other suitable structure (e.g., tubular), or may consist of the container or outer member alone. In some embodiments, the container may be a Dewar-like vacuum flask employing a conventional double wall construction with an interstitial vacuum typical of Dewar flasks. The thermal housing 208 may include multiple containers. The thermal housing 208 may be of any suitable configuration that prevents or reduces heat transfer from the downhole environment to the electronics package 202.

It is desirable that heat transfer from the environment is minimized. The thermal housing is one preventative measure. As will be discussed in greater detail below, assembly 200, and more particularly thermal isolation support 220, provides further passive cooling for the electronics package 202 by isolating the electronics package 202 from applied heat and/or heat generated from other tool components. The mechanisms for providing thermal isolation include providing a barrier to heat flow and absorbing heat.

A thermal isolation support 220 connects the chassis 203 to the tool 201. The thermal isolation support 220 mechanically connects the internal components, such as the chassis 203 and electronics package 202 (and, optionally, heat sinks 210) to the thermal housing 208. The chassis may be supported substantially exclusively by the thermal isolation support. The chassis 203 may include a metallic plate to support a printed circuit board (PCB), electronics and sensors.

In general embodiments of the present disclosure, the thermal isolation support 220 may include a structural framework attached to the tool. The framework is configured to minimize axial heat transfer from other tool components to the chassis 203.

FIGS. 3A-3E illustrate a thermal isolation support in accordance with embodiments of the present disclosure. The thermal isolation support 320 comprises a structural framework 310 including a plurality of structural members 308 and, optionally, a base member 312. Each of the structural members is deviated at least 30 degrees from an axis parallel to a longitudinal axis of the downhole tool, although in other embodiments the structural members may deviate by less, such as at least 20 degrees, at least 10 degrees, and so on. With increasing deviation from vertical, thermal energy must travel a significantly longer distance along the support members to reach the end of the thermal isolation support coupled to the chassis upon which the thermally sensitive components are mounted, and thus the amount of time required for elevation of temperature at those components to a level sufficient to affect performance is increased. At least one structural member of the framework may be connected to at least one other structural member for increased stability of the framework. For example, the framework may be implemented as a mesh structure 322 of connected structural members 308.

The framework may be implemented as a multi-material additive manufacturing structure. For example, the thermal isolation support may utilize structural members generated via additive manufacturing. In embodiments, the multi-material additive manufacturing structure may comprise an electrically insulating non-metallic material joined with at least one of: i) titanium; and ii) inconel. The electrically insulating non-metallic material may include at least one of i) a plastic; and ii) a polymer (e.g., polyether ether ketone ('PEEK')).

In one example, the thermal isolation support is manufactured with direct metal laser manufacturing ('DMLM'), such as, for example, direct metal laser melting, direct metal laser sintering, and so on. The use of titanium in DMLM allows for an unsupported build angle of up to 30 degrees or more from horizontal. That is, a majority of the plurality of structural members of the structural framework may be substantially non-parallel with a longitudinal axis of the downhole tool. Thermal isolation support 320 is a spiral mesh structure 322 building at an angle of 30 degrees, thereby maximizing the heat path distance through the part. In operation, a considerable temperature difference may develop between the ends of the thermal isolation support 320. This temperature difference is desirable in logging instruments to prolong the logging time. Interspersed in this mesh structure are vertical supports 301 configured to provide structural rigidity. The location of the vertical supports throughout the part is configured to minimize the contribution of the support to heat transfer.

The base 302 of the part comprises a flat plate, providing a mounting surface for mounting in the tool. The base also provides a surface acting as a substrate for the additive manufacturing process. A transitional region 303 ensures a rigid and durable transition between the mesh and mounting plate. At the opposing end from the base are extensions 305 with tapped holes 307. Because of the limitations in manufacturing unsupported regions with DMLM, it may be desirable to accommodate mounting from the opposite direction on this top surface. Components may be fastened to the thermal isolation support via threaded attachment to this region. Similar to the base, the top of this part may be configured to provide a smooth transition with the mesh while minimizing stress concentration regions.

Embodiments of the present disclosure may be configured to implement an active cooling system, cabling, both in combination, or additional systems. Components related to any of these may increase heat energy reaching the heat sensitive components on the chassis. For example, in addition to the structural members, other leading paths for heat transfer are through the coolant intake and outtake, and through electronic wiring.

To mitigate these thermal shortcuts, thermal isolation supports of the present disclosure combine all these features while maximizing structural strength and minimizing heat transfer by employing novel structures and techniques, as described below. Structural members may have a materially non-uniform cross-section, for example. In some implementations, the structural members may be tubular so that an active cooling system, cabling, or both may be implemented inside at least one structural member. As one example, the framework 310 defines interior channels for circulating a coolant through the thermal isolation support.

Returning to FIGS. 3B-3E, within the thermal isolation support 320 are two channels 331, 332, one on each side.

Each channel climbs through a helical structural member to the top surface. These channels permit the flow of a coolant through the part to and from the electronics. The thermal isolation support may be composed of both titanium and an electrically insulating material (e.g., PEEK). In one example, clockwise helixes may be constructed of a first material and the counterclockwise helixes constructed of a second material (different from the first material). The thermal isolation support may comprise several electrically isolated conductive (e.g., titanium) substantially helical supports. These independent helixes can each act as electrical conductors, permitting electrical power and signal to flow across the thermal isolation support. Though the embodiment of FIGS. 3B-3E comprises opposing sets of 8 helixes, this number can be increased or reduced depending on the particular application. Increasing the number of helixes may increase the number of electrical pathways through the part, for example.

As noted above, for additional structural strength, the structural members of the framework may be connected to one another, preferably via the manufacture of the members as an integrated structure, such as a mesh. The structure may be manufactured monolithically, such as, for example, through the use of additive manufacturing. Various materials having varying degrees of heat and/or electrical conductivity may be manufactured together to form the structure. Additionally or alternatively, the structure may include electrical conductors made up of electrically conductive material. That is, by utilizing multi-material additive manufacturing, portions of the structure can also be used as a multi-conductor electrical contact, permitting communication from outside the flask to the electronics. Thus, in specific embodiments, the framework provides a mount for supporting the sensitive components (e.g., electronics) as do conventional supports, but built within structural members of the framework are volumes of material performing the functions of the system components noted above. Aspects of the present disclosure merge key features of an active cooling system into one part, thus reducing the total number of heat paths.

Figure 4A:
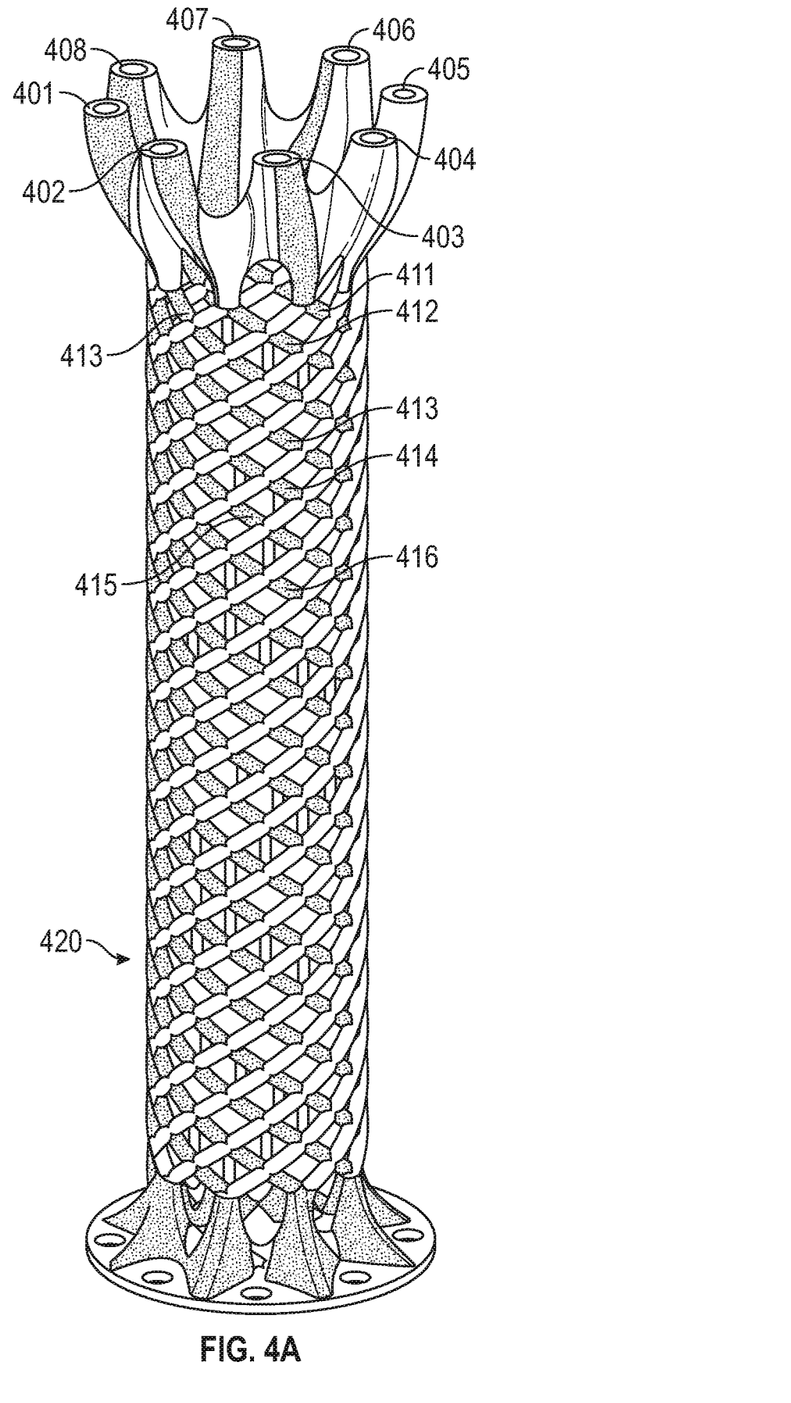
FIG. 4A-4C illustrate another thermal isolation support in accordance with embodiments of the present disclosure.
Figure 4B:
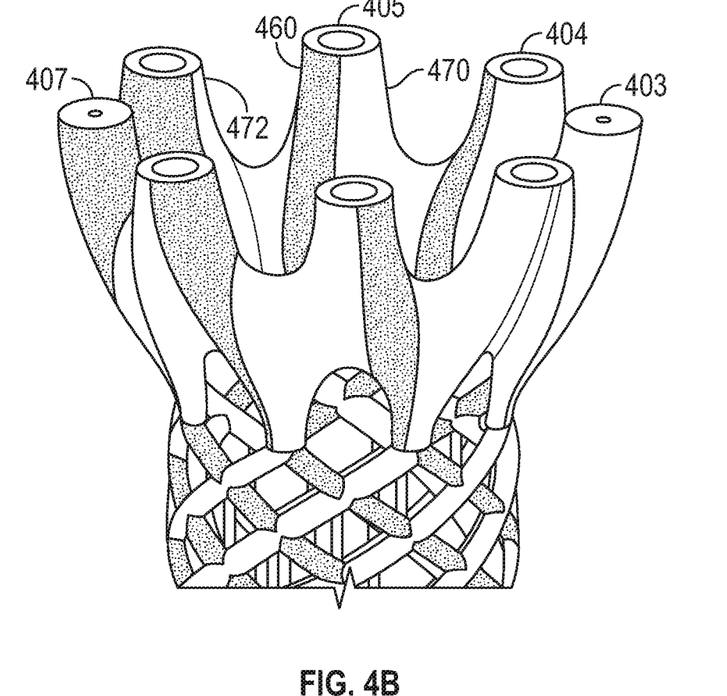
Figure 4C:
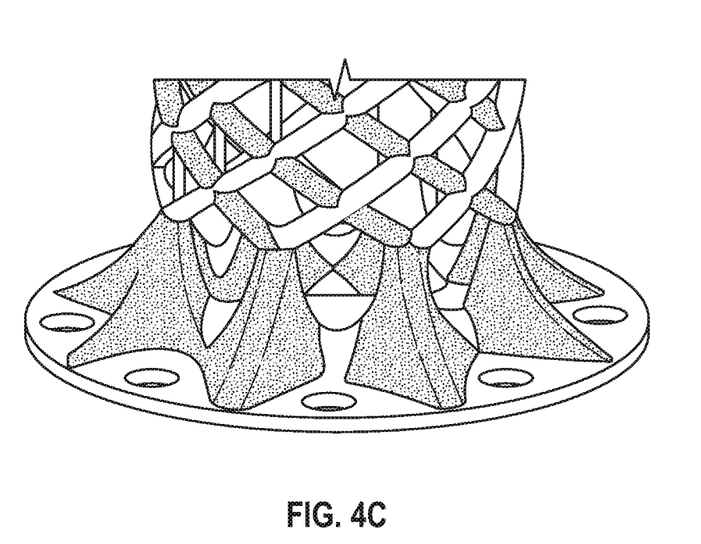

FIG. 4A-4C illustrate another thermal isolation support in accordance with embodiments of the present disclosure. The thermal isolation support 420 includes electrical conductors 401-408 comprising portions of the support 420 made up of electrically conductive material. The material extends through the support as conductor paths 411-418. An electrically conductive portion 460 (e.g., titanium) may be electrically insulated by adjacent insulating portions 470, 472 (e.g., PEEK, composite, carbon fiber, etc.).

Thus, as part of operations downhole (e.g., a geothermal directional drilling application), tool electronics are housed in a Dewar flask-type container to restrict heat transfer from the environment. Due to the limited temperature rating of these electronics (e.g., 175° C.), it may be desirable that heat transfer from the environment (e.g., 300° C.) is minimized. To mitigate thermal shortcuts, the support described above is configured to utilize additive manufacturing to combine various features while maximizing structural strength and minimizing heat transfer. A mesh-like structure may provide a mount for supporting the electronics. Built within may be channels for circulating a coolant through the part. In addition, by utilizing multi-material additive manufacturing, the part can also be used as a multi-conductor electrical contact, permitting communication from outside the flask to the electronics.

The foregoing description is directed to particular embodiments of the present invention for the purpose of illustration and explanation. It will be apparent, however, to one skilled in the art that many modifications and changes to the embodiment set forth above are possible without departing from the scope of the invention. It is intended that the following claims be interpreted to embrace all such modifications and changes.

The term "conveyance device" or "carrier" as used above means any device, device component, combination of devices, media and/or member that may be used to convey, house, support or otherwise facilitate the use of another device, device component, combination of devices, media and/or member. Exemplary non-limiting conveyance devices include drill strings of the coiled tube type, of the jointed pipe type and any combination or portion thereof. Other conveyance device examples include casing pipes, wirelines, wire line sondes, slickline sondes, drop shots, downhole subs, BHA's, drill string inserts, modules, internal housings and substrate portions thereof, self-propelled tractors. As used above, the term "sub" refers to any structure that is configured to partially enclose, completely enclose, house, or support a device. As used herein, the term "framework" refers to a structure residing in a space of a fundamental three dimensional shape resembling the framework, while taking up less than 65 percent of the space within the shape. As used herein, the term "structural framework" refers to components for the purpose of maintaining the relative location of the internal components with respect to the thermal housing.

The term "information" as used above includes any form of information (Analog, digital, EM, printed, etc.). The term "processor" or "information processing device" herein includes, but is not limited to, any device that transmits, receives, manipulates, converts, calculates, modulates, transposes, carries, stores or otherwise utilizes information. An information processing device may include a microprocessor, resident memory, and peripherals for executing programmed instructions. The processor may execute instructions stored in computer memory accessible to the processor, or may employ logic implemented as field-programmable gate arrays ('FPGAs'), application-specific integrated circuits ('ASICs'), other combinatorial or sequential logic hardware, and so on. Thus, configuration of the processor may include operative connection with resident memory and peripherals for executing programmed instructions. The phrase "substantially non-parallel with a longitudinal axis of the downhole tool" is defined as at least 50 percent of the structural member deviating more than 10 degrees from an axis parallel to a longitudinal axis of the downhole tool.

Given the extended time that the BHA and logging tool may be exposed to the downhole environment, a strictly passive thermal isolation system may not be sufficient to fully protect heat sensitive components from the heat applied by the downhole environment and/or the heat generated by devices such as electrical components. Thus, in embodiments, in conjunction with the thermal isolation systems previously described, an active cooling system may be utilized to cool heat sensitive components. In one arrangement, heat sensitive electronic components are juxtaposed with one or more refrigeration devices such as sorbent coolers. The active cooling system may be a powered device selected from a group consisting of a: (i) Peltier cooler; (ii) closed-loop cooling unit; and (iii) heat pump that employs one of: (a) Joule-Thompson effect and (b) Stirling Engine. Of course, active cooling may also be utilized with heat sensitive components conveyed by non-rigid conveyance devices.

While the foregoing disclosure is directed to the one mode embodiments of the disclosure, various modifications will be apparent to those skilled in the art. It is intended that all variations be embraced by the foregoing disclosure.

What is claimed is:

1. An apparatus for use in a borehole intersecting an earth formation, the apparatus comprising:
an assembly associated with a downhole tool and configured to thermally isolate a thermally sensitive component, the assembly comprising:
a thermal housing;
at least one internal component inside the thermal housing, wherein the at least one internal component comprises the thermally sensitive component and a chassis;
a thermal isolation support connecting the chassis to the downhole tool;
wherein the thermal isolation support comprises an additive manufacturing structural framework, the framwork including a plurality of connected structural members, with a structural member of the plurality defining a channel through the structural member configured to one of: (i) permit flow of a fluid through the channel and (ii) include a cabling through the channel.

2. The apparatus of claim 1, wherein a majority of the plurality of connected structural members are substantially non-parallel with a longitudinal axis of the downhole tool.

3. The apparatus of claim 2, wherein at least one structural member of the plurality of the additive manufacturing structural framework is directly connected to at least two other structural members of the plurality.

4. The apparatus of claim 1, wherein the framework includes first structural members of the plurality comprising a first material and second structural members of the plurality comprising a second material different than the first material.

5. The apparatus of claim 1, wherein the additive manufacturing structural framework comprises clockwise helixes and counterclockwise helixes.

6. The apparatus of claim 1, wherein the channel is part of a cooling system and is configured for one of transferring the fluid into an interior of the thermal housing and transferring the fluid from the interior of the thermal housing.

7. The apparatus of claim 1, wherein the thermally sensitive component comprises at least one downhole electronic component.

8. The apparatus of claim 1, wherein the at least one internal component is supported substantially exclusively by the thermal isolation support.

9. The apparatus of claim 1, wherein the additive manufacturing structural framework comprises a multi-material additive manufacturing structural framework including an electrically non-conductive material and an electrically conductive material.

10. A method of investigating a borehole intersecting an earth formation, the method comprising:
conveying a downhole tool in the borehole, the downhole tool having associated therewith an assembly configured to thermally isolate a thermally sensitive component, the assembly comprising:
a thermal housing;
at least one internal component inside the thermal housing, wherein the at least one internal component comprises the thermally sensitive component and a chassis;
a thermal isolation support connecting the chassis to the downhole tool;
wherein the thermal isolation support comprises an additive manufacturing structural framework, the framework including a plurality of connnected strucutral members, with a structural member of the plurality of defining at least one of (i) a channel through the structural member configured to permit flow of a fluid through the channel, and (ii) an electrical conductor provided by a portion of the strucutal member made up of electrically conductive material.

11. The method of claim 10, wherein the channel is part of a cooling system and is configured for one of transferring the fluid into an interior of the thermal housing and transferring the fluid from the interior of the thermal housing.

12. The method of claim 10, wherein the additive manufacturing structural framework comprises a multi-material additive manufacturing structural framework including an electrically insulating material joined with the electrically conductive material.

13. The method of claim 10, wherein the thermally sensitive component comprises at least one downhole electronic component.

14. An apparatus for use in a borehole intersecting an earth formation, the apparatus comprising:
an assembly associated with a downhole tool and configured to thermally isolate a thermally sensitive component, the assembly comprising:
a thermal housing;
at least one internal component inside the thermal housing, wherein the at least one internal component comprises the thermally sensitive component;
a thermal isolation support connecting the at least one internal component to the downhole tool;
wherein the thermal isolation support comprises an additive manufacturing structural framework connected to the downhole tool, the framework including a plurality of connected structural members, with a structural member of the plurality defining an electrical conductor provided by a portion of the structural member made up of electrically conductive material.

15. The apparatus of claim 14, wherein the additive manufacturing structural framework comprises a multi-material additive manufacturing structural framework including an electrically insulating material joined with the electrically conductive material.

16. The apparatus of claim 15, wherein the electrically insulating material comprises at least one of i) a plastic; and ii) a polymer.

17. The apparatus of claim 15, wherein the electrically conductive material comprises at least one of: i) titanium; and ii) inconel.

18. The apparatus of claim 14, wherein the additive manufacturing structural framework comprises clockwise helixes and counterclockwise helixes.

19. The apparatus of claim 14, wherein a majority of the plurality of connected structural members are substantially non-parallel with a longitudinal axis of the downhole tool.

20. The apparatus of claim 19, wherein at least one structural member of the plurality of the additive manufacturing structural framework is directly connected to at least two other structural members of the plurality.

* * * * *